(12) United States Patent
Doering

(10) Patent No.: US 8,623,306 B2
(45) Date of Patent: Jan. 7, 2014

(54) METHOD FOR USE IN CONNECTION WITH AN EXHAUST GAS POST-TREATMENT SYSTEM

(71) Applicant: MAN Truck & Bus AG, Munich (DE)

(72) Inventor: Andreas Doering, Munich (DE)

(73) Assignee: MAN Truck & Bus AG, Munich (DE)

( * ) Notice: Subject to any disclaimer, the term of this patent is extended or adjusted under 35 U.S.C. 154(b) by 0 days.

(21) Appl. No.: 13/733,252

(22) Filed: Jan. 3, 2013

(65) Prior Publication Data
US 2013/0259778 A1 Oct. 3, 2013

(30) Foreign Application Priority Data

Mar. 30, 2012 (DE) .................. 10 2012 006 449

(51) Int. Cl.
B01D 53/94 (2006.01)
F01N 3/18 (2006.01)
F01N 3/20 (2006.01)

(52) U.S. Cl.
USPC ............... 423/213.2; 60/274; 60/299; 60/301

(58) Field of Classification Search
USPC .......................... 423/213.2; 60/274, 299, 301
See application file for complete search history.

(56) References Cited

U.S. PATENT DOCUMENTS

| 5,185,305 | A  | * | 2/1993  | Subramanian et al. | 502/65 |
| 2008/0250778 | A1 | * | 10/2008 | Solbrig | 60/301 |
| 2012/0006004 | A1 | * | 1/2012  | Tai et al. | 60/274 |

FOREIGN PATENT DOCUMENTS

| DE | 36 04 045 C1 | 1/1987 |
| DE | 40 38054 A1 | 6/1992 |
| EP | 0362483 A1 | 4/1990 |

* cited by examiner

Primary Examiner — Timothy Vanoy
(74) Attorney, Agent, or Firm — Lucas & Mercanti, LLP

(57) ABSTRACT

A method for use with an exhaust gas post-treatment system on an internal combustion engine operated with air surplus includes reducing nitrous oxides in that an ammonia-separating reducing agent is added to the exhaust gas flow upstream of a catalyst which is charged with a catalyst material for selective catalytic reduction of nitrous oxides. The method further provides that the $NH_3$ to $NO_x$ ratio (feed ratio $\alpha$) is varied in phases by changing the untreated nitrous oxide emissions of the internal combustion engine such that the feed ratio $\alpha$ oscillates in phases about a predefined value.

13 Claims, 5 Drawing Sheets

METHOD FOR USE IN CONNECTION WITH AN EXHAUST GAS POST-TREATMENT SYSTEM

BACKGROUND OF INVENTION

1. Field of Invention

The invention concerns a device for post-treatment of exhaust gases from internal combustion engines, in particular lean-burn internal combustion engines of motor vehicles.

2. Description of Prior Art

The use of SCR catalysts to reduce the nitrous oxides in an exhaust gas flow from an internal combustion engine is generally known. As part of the selective catalytic reduction (SCR) performed with this SCR catalyst, a substance with directly reducing action is supplied to the exhaust gas flow, such as ammonia or a pre-product which only releases reducing substances in the exhaust gas. The pre-product can for example be a watery urea solution.

In internal combustion engines operated in motor vehicles, nitrous oxide reduction with the SCR process is therefore difficult because firstly fluctuating operating conditions predominate here which makes it difficult to supply the reducing agent in the correct quantities, and secondly for safety reasons the extremely reactive reducing agent ammonia cannot be used directly but must be produced by the decomposition of ammonia precursor substances such as urea, guanidinium formiate, ammonium carbonate, etc.

Also it must be noted that although firstly as high a conversion rate of nitrous oxides as possible is to be achieved, secondly unnecessary emissions of unconsumed reducing agent such as for example ammonia must be avoided.

In connection with the decomposition of urea into ammonia, it is known that under optimum conditions, i.e., at temperatures above 350° C., this takes place in two stages. According to $$(NH_2)_2CO \rightarrow NH_3 + HNCO \qquad (1)$$

first thermolysis takes place, i.e., the chemical decomposition of urea. Then according to $$HNCO + H_2O \rightarrow NH_3 + CO_2 \qquad (2)$$

hydrolysis occurs, i.e., the catalytic decomposition of iscocyanic add (HNCO) into ammonia ($NH_3$) and carbon dioxide ($CO_2$).

To convert one mole of nitrous monoxide, one mole of ammonia is needed.

$$4NO + 4NH_3 + O_2 \rightarrow 4N_2 + 6H_2O \qquad (3)$$

The ratio between $NH_3$ and $NO_x$ is known as the feed ratio $\alpha$.

$$\alpha = NH_3/NO_x \qquad (4)$$

In an ideal catalyst this means that with a feed ratio of one, all nitrous oxides are reduced so that a 100% $NO_x$ conversion is achieved, because for the $NO_x$ conversion $X_{NOx}$:

$$X_{NOx} = \frac{c_{NOx,0} - c_{NOx}}{c_{NOx,0}} \qquad (5)$$

where: $c_{NOx,0}$: untreated $NO_x$ emissions [ppm]
$c_{NOx}$: $NO_x$ emissions after catalyst [ppm]

If the quantity of ammonia supplied exceeds that of the converted nitrous oxides, unconsumed ammonia is emitted. Because of its toxicity, this must be avoided under all circumstances.

To better understand the process at the catalyst, some reaction principles are outlined briefly below.

If we consider the reaction $$|\nu_1|\cdot A_1 + |\nu_2|\cdot A_2 \rightarrow |\nu_3|\cdot A_3 + |\nu_4|\cdot A_4 \qquad (6)$$

where: A1, A2: educts
A3, A4: products
$v_1$: stoichiometric factors
$v_1 < 0$ for educt
$v_1 > 0$ for product then this proceeds at a specific speed known as the reaction speed "r" (7). This is defined as the temporal change in the component "i" in relation to the stoichiometric factor. It therefore relates to a reaction equation and is valueless without this being specified.

$$r = \frac{1}{v_i} \cdot \frac{dn_i}{dt} \qquad (7)$$

where: $n_i$: mole count of component i [mol]
t: time [s]

For a volume-resistant reaction, the mole count change "$dn_i$" can be replaced by the concentration change "$dc_i$":

$$r = \frac{1}{v_i} \cdot \frac{dc_i}{dt} \qquad (8)$$

where: $c_i$; concentration of component i [mol/m3]

If it is not the speed of a particular reaction which is important but the change of a component, then the substance quantity change rate "R" is used.

$$R_i = \frac{dc_i}{dt} \qquad (9)$$

For the case of N reactions therefore:

$$R_i = \frac{dc_i}{dt} = \sum_{j=1}^{N} v_{ij} \cdot r_j \qquad (10)$$

To allow better comparison of reaction speed and substance quantity change rate of different catalysts, these are related to representative values such as, e.g., the catalyst mass, the catalyst volume or the phase boundary area.

There are several ways of describing the correlations determining the reaction speed, one of which is the so-called potency method which is used if the reaction mechanism is unknown.

$$r = k \cdot c_1^{m_1} \cdot c_2^{m_2} \qquad (11)$$

where k: speed constant of reaction
m: order of magnitude in relation to reactants Ai, $m_i \in R$
m:

$$m = \sum_{i=1}^{N} m_i:$$

total order of reaction

The part orders "$m_i$" of the reactants are normally determined from laboratory measurements.

The speed of a reaction depends not only on the concentration of the educts and their order, but naturally also on the temperature "T". In the above method this is contained in the speed constant "k".

$$k = k_O \cdot e^{\left(-\frac{E_A}{R \cdot T}\right)} \quad (12)$$

where $k_O$: frequency or shock factor [$mol^{1-m} \cdot s^{-1}$]
$E_A$: activation energy [J/mol]
R: general gas constant 8.31 J/molK For the substance change speed for NO at SCR catalysts, a so-called formal kinetic method (potency method) can be used in the form $$R_{NO} = k \cdot c_{NO}^m \cdot c_{NH_3}^n \quad (13)$$

wherein "m" normally assumes the value "one" and "n" the value "zero".

In practical terms this means that the substance quantity change rate can be increased by raising the NO concentration, while an increase in $NH_3$ concentration has no effect on this.

If a platinum-containing NO oxidation catalyst is connected before the SCR catalyst to form $NO_2$ $$2NO + O_2 \leftrightarrow 2NO_2 \quad (14)$$

then the SCR reaction can be substantially accelerated and the low temperature activity perceptibly increased.

$$NO + 2NH_3 + NO_2 \rightarrow 2N_2 + 3H_2O \quad (15)$$

Since the reducing agent, e.g., on use of the reducing fluid known as AdBlue®, is present in a form dissolved in water, this water must be evaporated before and during the actual thermolysis and hydrolysis, if the temperatures in the two reactions above lie below 350° C. or if heating takes place only slowly, mainly solid, unmeltable cyanuric add is formed by trimerisation of the isocyanic acid, which leads to solid deposits on or even clogging of the SCR catalyst. This can be remedied as described in DE 40 38 054 A1 in that the exhaust gas flow charged with the reducing agent is passed over a hydrolysis catalyst. The exhaust gas temperature at which quantitative hydrolysis is possible can thus be lowered to 160° C. as long as the urea quantities added are not too great. Such an additional hydrolysis catalyst however further increases the cost of the arrangement for exhaust gas post-treatment.

Despite these measures it is often not possible to avoid the formation of cyanuric acid, melamine or other undesirable solid reaction products, in particular if the $NH_3$ precursor substance, such as urea or urea watery solution, and the exhaust gas are not evenly distributed over the entire flow cross section or the quantities added are too great. It is particularly critical here if locally large quantities of reducing agents make contact with the pipe walls or urea decomposition catalysts while at the same time at this point there is a local minimum flow speed. This has the result that the exhaust gas cannot provide sufficiently high heat quantities to ensure a quantitative decomposition of the reducing agent into $NH_3$. Rather at these points, said deposits of undesirable reducing agent decomposition products occur.

This effect is further amplified by the fact that in vehicles only a very restricted construction space is available for preparation of the reducing agent, which means that in particular in the inflow to the catalyst, the inlet lengths are very short, which in turn leads to a very poor equidistribution over the catalyst cross section because of the flow dead zones, cross section changes and/or flow stalling.

All this has the result that the $NO_x$ conversion is not usually limited by the actual SCR reaction but by the release of ammonia from its precursor substances.

DE 3604045C1 and EP 362 483 A1 disclose methods of using a periodically fluctuating addition of ammonia instead of a continuous, stationary ammonia addition, in order to raise the $NO_x$ conversion rate at the SCR catalyst.

Here briefly more ammonia is added than would be necessary under stationary conditions, in particular the feed ratio here can rise above one, and then the ammonia quantity falls below the quantity necessary under stationary conditions or is even interrupted completely.

The reason for the rise in $NO_x$ conversion observed with this process is the inhibition of educts by ammonia, which can be reduced by briefly lowering the $NH_3$ quantity in the exhaust gas and hence on the catalyst surface.

This method cannot however simply be applied to SCR systems which do not use pure ammonia but an ammonia precursor substance, since because of the periodically very great over-supply, usually the decomposition of reaction medium is incomplete and consequently deposits occur in the form of cyanuric acid, melamine, etc.

SUMMARY OF THE INVENTION

The object of the invention is to propose a method for post-treatment of exhaust gases in an exhaust gas system of internal combustion engines, in particular lean-burn internal combustion engines of motor vehicles, which in a simple and reliable manner allows a functional, in particular quantitatively improved $NO_x$ conversion in the exhaust gas.

To reduce the educt inhibition by ammonia deposited on the catalyst surface, the untreated $NO_x$ emissions are periodically raised and lowered without adapting the supplied quantity of reducing agent accordingly, in particular proportionally. This has the consequence that in phases with high untreated $NO_x$ emissions, the $NO_x$ quantity exceeds the supplied quantity of reducing agent so that the feed ratio falls, which in turn has the consequence that the $NO_x$ reacts with the ammonia deposited on the catalyst so that its ammonia charge falls, since this is now consumed, without it being able to be replaced by sufficient $NH_3$ from the gas phase. In addition by the increase in untreated $NO_x$ emission as described above, the substance quantity change rate and hence the converted $NO_x$ quantity are raised.

In phases with low untreated $NO_x$ emission however the supplied quantity of reducing agent exceeds the quantity necessary for the corresponding $NO_x$ conversion, so that a high feed ratio is present, whereby the catalyst is again charged with ammonia.

The advantage of this method is that it is possible to change the quantity of $NH_3$ stored on the catalyst even under usage conditions critical for the decomposition of reducing agent, such as low exhaust gas temperature and/or low exhaust gas mass flow, since there is no need to increase the reducing agent quantity to recharge the catalyst with ammonia. In addition the converted $NO_x$ quantity is raised by increasing the substance quantity change rate.

The method also allows operation of the internal combustion engine, at least in phases, at a higher $NO_x$ level which usually leads to improved efficiency and hence lower fuel consumption.

To accelerate the "discharge" of ammonia from the catalyst, it is possible in the phases with high untreated $NO_x$ emissions to lower the supplied quantity of reducing agent or interrupt it completely. Evidently in operating phases in which a secure reducing agent decomposition is guaranteed, it is also conceivable to raise the supplied quantity of reducing agent in the phases with low untreated $NO_x$ emissions and thus accelerate the deposition of ammonia. As already explained, the untreated $NO_x$ emissions can be varied by changing operating parameters of the internal combustion engine. Operating parameters which have a direct effect on the $NO_x$ emissions include the start of injection, the air/fuel ratio (lambda), the injection pressure, the number of individual injections per working cycle, the intake air temperature and the exhaust gas quantity recirculated (EGR rate) where exhaust gas recirculation is provided. Here the following changes in the above operating parameters lead to a rise in untreated $NO_x$ emissions:

- advance of injection start,
- shift in the air/fuel ratio in the direction of higher lambda values,
- increase in injection pressure,
- reduction in the number of individual injections per working cycle,
- increase in intake air temperature, e.g., by bypassing the charge air cooler,
- reduction in the quantity of recirculated exhaust gas.

Evidently the measures to increase or reduce the untreated $NO_x$ emissions must be adapted to the other operating conditions of the internal combustion engine, in particular when used in a motor vehicle, e.g., to the maximum possible cooling power of the engine cooling, the power requirement by the driver.

As the ammonia intake and output behaviour depends greatly on the operating conditions of the exhaust gas post-treatment, such as catalyst temperature, ammonia charge level of catalyst, $NO_x$ conversion rate, untreated $NO_x$ emissions, $NO_2$ emission upstream of the SCR catalyst, $NO_x$ emission after the system, $NH_3$ emission after the system, and supplied quantity of reducing agent, it is advantageous to make the period length and/or the amount of rise and/or the amount of fall and/or the duration of rise and/or the duration of fall of the untreated $NO_x$ emissions and/or the supplied quantity of reducing agent dependent on these values. The following correlation is observed:

The period duration and/or the amount of rise and/or the amount of fall and/or the duration of rise and/or the duration of fall of the untreated $NO_x$ emissions rise as the catalyst temperature falls and/or the $NO_2$ emissions upstream of the SCR catalyst fall when the $NO_2/NO_x$ ratio is less than one, and/or as the $NO_2$ emissions upstream of the SCR catalyst rise when the $NO_2/NO_x$ ratio is greater than one, and/or as the post-system $NH_3$ emissions fall and/or the supplied quantity of reducing agent fails and/or the $NO_x$ conversion rate falls and/or the post-system $NO_x$ emissions rise.

The operating conditions can be determined firstly directly via sensors or via models in the form of mathematical functions, maps and/or neuronal networks. Such techniques have been known to the person skilled in the art for some time so there is no need for a detailed description.

FIG. 5 is schematic diagram showing an SCR catalyst 10 with a clean gas side 11 in an exhaust flow of an internal combustion engine. Also shown is a reducing agent input 12 upstream of the SCR catalyst 10. A charge of material with oxidative action arranged on the clean gas side 11 decomposes unconsumed $NH_3$ passing the SCR catalyst 10.

BRIEF DESCRIPTION OF THE DRAWINGS

The function of the method proposed will be explained below in more detail with reference to some examples, with reference to the figures, in which.

DETAILED DESCRIPTION OF THE PREFERRED EMBODIMENTS

Figure 1:
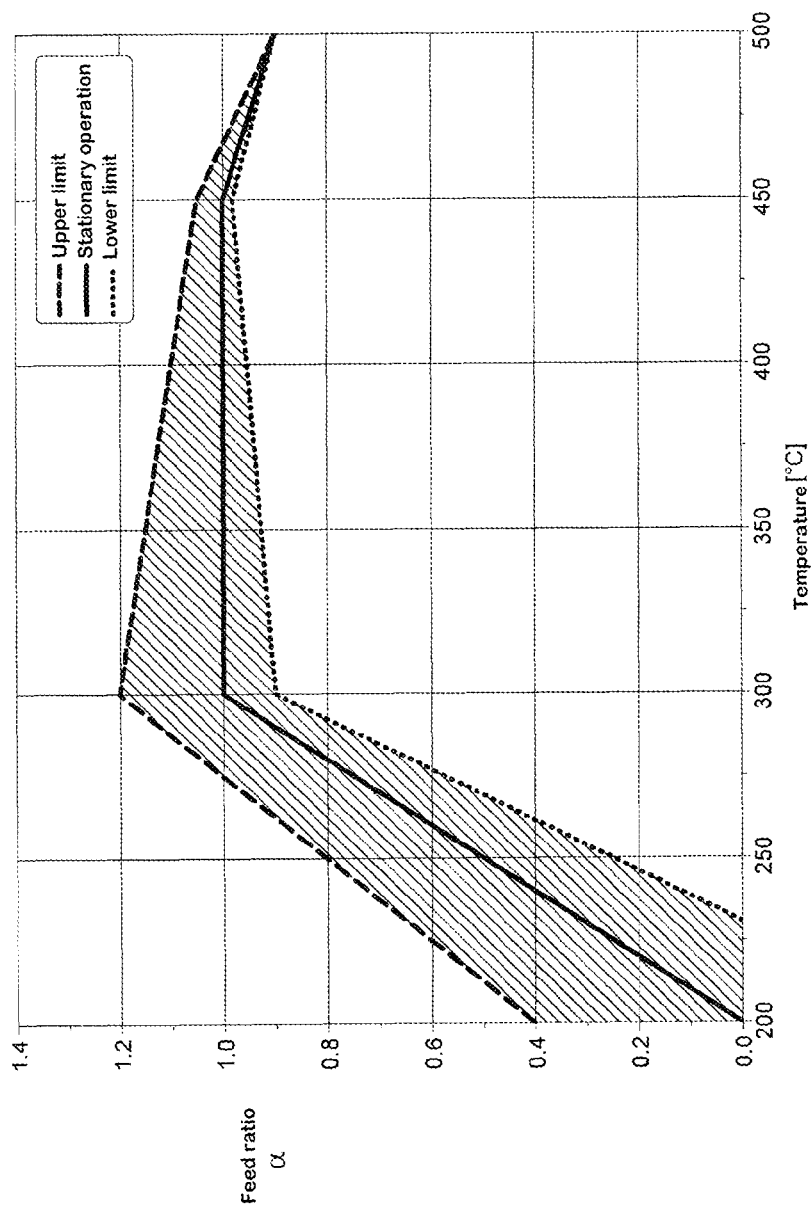
FIG. 1 is a graph showing a principle depiction of the region within which the feed ratio is changed.

FIG. 1 shows in a principle depiction the dependency of the catalyst temperature and feed ratio at an SCR catalyst in an internal combustion engine in relation to the maximum achievable conversion rate of nitrous oxides, where the abscissa shows the temperature and the ordinate the feed ratio α. The curve shown by the solid line indicates the theoretical feed ratio α which would be selected for a specific catalyst temperature in order to achieve a maximum conversion rate at this catalyst temperature for the nitrous oxides supplied to the catalyst. It thus constitutes a theoretical stationary state. It has now been found that if the feed ratio α varies within particular limits which can be established only by experiment for a particular catalyst type as a function of the catalyst temperature, by changing the untreated $NO_x$ emissions accordingly, the $NO_x$ conversion rate can be increased substantially. Said limits are also shown in FIG. 1 related to temperature in order to clarify the correlation principle. The dashed line indicates the temperature-related upper limit and the dotted line the lower limit for the variation width of the feed ratio α. Explained using an example, this means that for a catalyst temperature of 250° C. the feed ratio α is varied about the theoretical value 0.5 at short intervals, e.g. periodically, within the limits of 0.25 and 0.8. This variation as already stated is achieved in that the untreated $NO_x$ emissions of the internal combustion engine are briefly raised and then lowered again. Measures on the engine which achieve this have been known to the person skilled in the art for some time and have already been discussed above.

In tests it has proved advantageous to vary the untreated $NO_x$ emissions and/or the feed ratio α by at least 20%, preferably by at least 40%, most preferably by at least 60%.

In order to show the influence of the variation of untreated $NO_x$ emissions on the conversion rate, measurements were carried out on a specimen catalyst as described below in connection with FIGS. 2 and 3 in one example. The measurements were made on an internal combustion engine of type MAN-D2676 with external, cooled exhaust gas recirculation, in the exhaust tract of which an SCR catalyst with the following values was fitted:

- cell count: 300 cpsi
- active component: $V_2O_5$ on $WO_3$-stabilised $TiO_2$
- volume: 30.3 l The untreated $NO_x$ emissions were varied by variation of the exhaust gas quantity recirculated to the fresh air side (increase in EGR rate). The engine operating points were 1200 rpm/800 Nm, 1200 rpm/1200 Nm and 1200 rpm/1700 Nm; the resulting catalyst temperatures were 200° C., 300° C. and 400° C.

Figure 2:
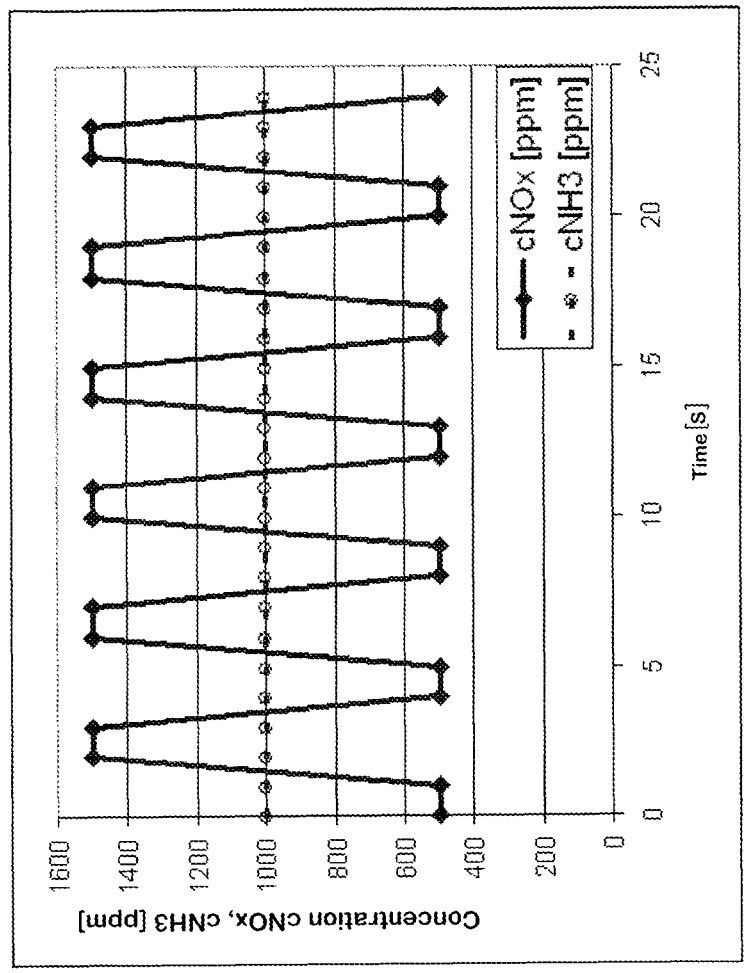
FIG. 2 is a graph showing a first example of a periodic curve of the $NO_x$ rise/$NO_x$ fall with constant reducing agent supply.
Figure 2:
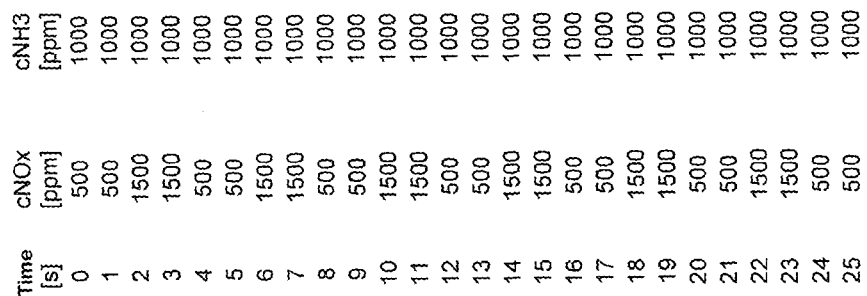

As shown in FIG. 2, the $NO_x$ concentration (in ppm) was varied so as to give a periodic trapezoid curve, wherein the $NO_x$ concentration oscillated symmetrically about the $NH_3$ concentration of 1000 ppm between the limit values of 500 ppm and 1500 ppm; the period duration was four seconds. FIG. 3 shows the $NO_x$ conversion rates in % for the catalyst temperatures 200° C., 300° C. and 400° C. achieved under the conditions selected in FIG. 2. As a comparison, FIG. 3 also shows the $NO_x$ conversion rates in % which were achieved with unvaried untreated $NO_x$ emissions, i.e. with period duration 0 seconds, and otherwise unchanged arrangement and procedure. It is not difficult to see that with the proposed method, a clear rise in $NO_x$ conversion rates is achieved even at low catalyst temperatures.

Figure 4:
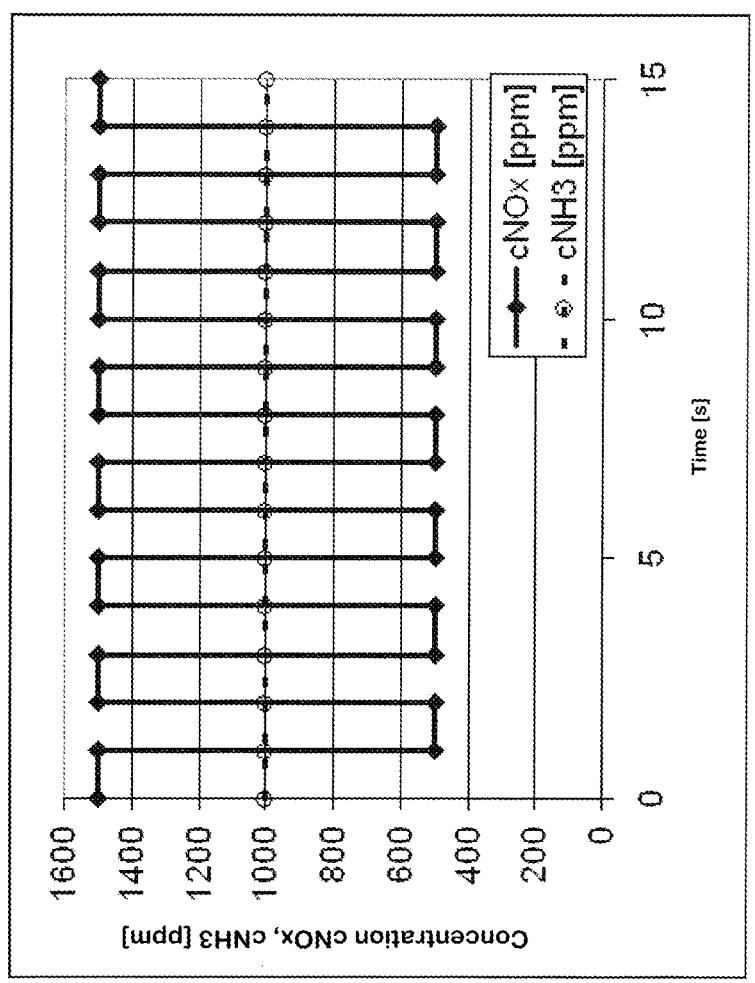
FIG. 4 is a graph showing a second example of a periodic curve of the $NO_x$ rise/$NO_x$ fall with constant reducing agent supply.
Figure 5:
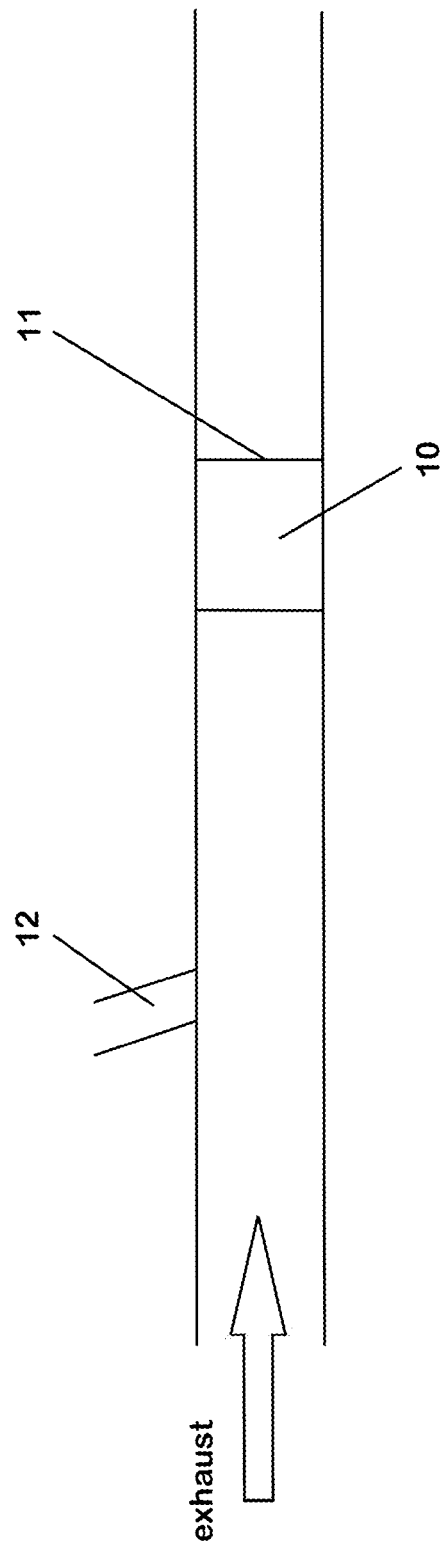
FIG. 5 is a schematic diagram of a exhaust flow in which the method of the present invention operates.

As FIG. 4 shows, the $NO_x$ concentration (in ppm) can naturally also be varied following another curve. A periodic rectangular curve is shown here, wherein the $NO_x$ concentration again oscillates symmetrically about the $NH_3$ concentration of 1000 ppm between the limit values 500 ppm and 1500 ppm.

Figure 3:
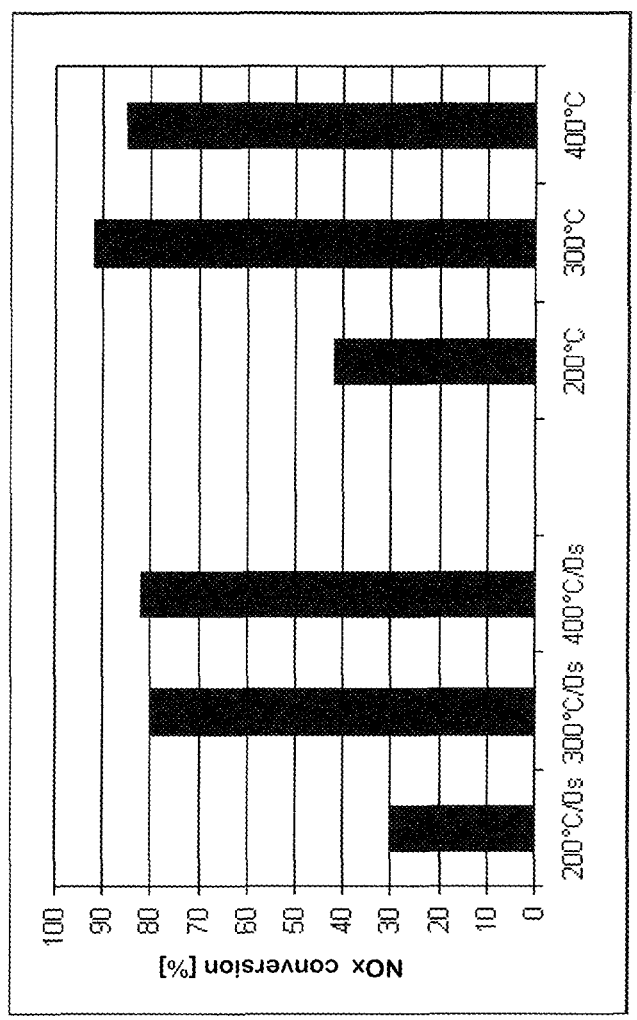
FIG. 3 is a graph showing $NO_x$ conversion rates in % at different catalyst temperatures and the curve of the $NO_x$ rise/$NO_x$ fall according to FIG. 2.

The period duration, which in the example in FIG. 3 is two seconds, can be used as a parameter for optimising the $NO_x$ conversion rate. The same applies to the amplitude of variation. The feed ratio α need not necessarily oscillate symmetrically about the theoretical stationary value (solid line in FIG. 1); it can in practice prove more useful to select the falls and rises in untreated $NO_x$ emissions asymmetrically (dotted and dashed lines in FIG. 1). As already emphasised above, a generally valid variation of feed ratio α can only be specified in so far as the value a is varied positively and negatively about an assumed theoretical value and this variation must be achieved by brief rises and falls in the untreated $NO_x$ emissions. The optimum amount of rise and fall to a great extent depends on the catalyst materials used and must be determined empirically for a catalyst of a specific type.

The core concept of the proposed process is that the $NO_3$ to $NO_x$ ratio (feed ratio α) is varied by changing the untreated nitrous oxide emissions in phases such that the feed ratio α oscillates in phases about a theoretical stationary value.

Evidently it is also possible to vary the above process, described as an example. Thus it is possible to optimise the effect of the method in that the supplied quantity of reducing agent is not adapted according to, in particular not proportional to, the periodically fluctuating, untreated $NO_x$ emissions. Also a lowering of the reducing agent quantity is conceivable here but it must be ensured, e.g., by temperature detection before and/or at the SCR catalyst, that the temperature does not fall below a predefined level when the reducing agent quantity is increased again.

Furthermore it may be advantageous to select the period length and/or the amount of rise and/or the amount of fall and/or the duration of rise and/or the duration of fall of the untreated $NO_x$ emissions as a function of the operating conditions of the exhaust gas post-treatment system. The operating conditions taken into account here can be the catalyst temperature and/or the ammonia charge level of the catalyst and/or the $NO_x$ conversion rate and/or the untreated $NO_x$ emissions and/or the $NO_2$ quantity upstream of the particle filter and/or the $NO_x$ emissions downstream of the exhaust gas post-treatment system and/or the $NH_3$ emissions downstream of the exhaust gas post-treatment system and/or the supplied quantity of reducing agent and/or the stored quantity of $NH_3$ and/or the $NH_3$ quantity which can be stored. Such operating conditions can be determined via sensors and/or via models, in the form of mathematical functions, maps and/or neuronal networks. Such techniques are well known to the person skilled in the art so no detailed description is required.

If despite the proposed measures the SCR catalyst allows unconsumed $NH_3$ to pass, it can be provided that this is decomposed by a charge of material with oxidative action arranged on the clean gas side and/or by increasing an ammonia storage capacity in the direction of the clean gas side to be able to buffer the ammonia peaks by storage.

The invention claimed is:

1. A method for an exhaust gas post-treatment system used with an internal combustion engine operated with air surplus, the method comprising:
   reducing nitrous oxides by adding an ammonia-separating reducing agent to an exhaust gas flow upstream of an SCR catalyst which is charged with a catalyst material for selective catalytic reduction of nitrous oxides, and
   varying a NH3 to $NO_x$ ratio (feed ratio α) in phases by periodically changing untreated $NO_x$ emissions of the internal combustion engine between phases of high untreated $NO_x$ emissions and low untreated $NO_x$ emissions such that the feed ratio oscillates in phases about a predefined value.

2. The method according to claim 1, wherein a quantity of the reducing agent supplied during said step of adding is not adapted to the periodically changing untreated $NO_x$ emissions.

3. The method according to claim 1, wherein said step of adding comprises reducing or interrupting completely the quantity of reducing agent in the phases with high untreated $NO_x$ emissions.

4. The method according to claim 1, wherein said step of adding comprises raising a quantity of reducing agent in the phases with low untreated $NO_x$ emissions.

5. The method according to claim 1, wherein the untreated $NO_x$ emissions are raised during said step of varying by changing one of a start of fuel injection, an air/fuel ratio, a fuel injection pressure, a number and temporal sequence of individual fuel injections during a working cycle, a quantity of recirculated exhaust gas, and an intake air temperature.

6. The method according to claim 1, wherein said step of varying further comprises selecting at least one of a period length, an amount of rise, an amount of fall, a duration of rise, and a duration of fall of the untreated $NO_x$ emissions as a function of operating conditions of the exhaust gas post-treatment system.

7. The method according to claim 6, wherein the operating conditions taken into account include at least one of a catalyst temperature, an ammonia charge level of the catalyst, an $NO_x$ conversion rate, untreated $NO_x$ emissions, an $N0_2$ quantity upstream of the SCR catalyst, $NO_x$ emissions downstream of the exhaust gas post treatment system, $NH_3$ emissions downstream of the exhaust gas post-treatment system, a supplied quantity of reducing agent, a stored $NH_3$ quantity, and an $NH_3$ quantity which can be stored.

8. The method according to claim 6, wherein the operating conditions of the exhaust gas post-treatment system are determined by at least one of sensors and models in the form of mathematical functions, maps or neuronal networks.

9. The method according to claim 1, further comprising the step of decomposing unconsumed $NH_3$ passing the SCR catalyst by a charge of material with oxidative action arranged on a clean gas side of the SCR catalyst.

10. The method according to claim 1, wherein said step of varying comprises varying one of the untreated $NO_x$ emissions and the feed ratio α by at least 20%.

11. The method according to claim 10, wherein said step of varying comprises varying one of the untreated $NO_x$ emissions and the feed ratio by at least 40%.

12. The method according to claim 11, wherein said step of varying comprises varying one of the untreated $NO_x$ emissions and the feed ratio α by at least 60%.

13. An arrangement for performance of the method according to claim 1, comprising an SCR catalyst in an exhaust flow, wherein a charge of the SCR catalyst with SCR active material is made such that an ammonia storage capacity of the SCR catalyst rises towards a clean gas side.

\* \* \* \* \*